United States Patent
Tollkuhn

[15] 3,642,228

[45] Feb. 15, 1972

[54] MAGNETIC TAPE CASSETTE

[72] Inventor: Arthur W. Tollkuhn, San Jose, Calif.

[73] Assignee: Memorex Corporation

[22] Filed: Sept. 21, 1970

[21] Appl. No.: 73,710

[52] U.S. Cl. ....................242/199, 274/4 C

[51] Int. Cl. ..........G03b 1/04, G11b 15/32, G11b 23/04

[58] Field of Search ..........242/197–200, 55.19 A; 274/4 C, 11 C; 352/72–78; 179/100.2 Z; 206/52 F, 59 E

[56] References Cited

UNITED STATES PATENTS

| | | | |
|---|---|---|---|
| 3,111,281 | 11/1963 | Sinkewitsch | 242/200 |
| 3,259,331 | 7/1966 | Liddle | 242/198 |
| 3,411,731 | 11/1968 | Kelley | 242/199 |
| 3,423,038 | 1/1969 | Katzef et al. | 242/199 |

*Primary Examiner*—Leonard D. Christian
*Attorney*—Limbach, Limbach & Sutton

[57] ABSTRACT

Top and bottom halves to be mated together to form a standardized magnetic cassette are provided. The design of each half facilitates the practice of a method of inserting tape into the cassette during manufacture. The structure of the bottom half has no obstructions between the tape path and the front edge of the cassette half.

3 Claims, 2 Drawing Figures

INVENTOR.
ARTHUR W. TOLLKUHN
BY
Limbach, Limbach & Sutton
ATTORNEYS

MAGNETIC TAPE CASSETTE

BACKGROUND OF THE INVENTION

This application relates generally to the structure of a magnetic tape cartridge and more particularly to the structure of a twin-hub tape cartridge of the coplanar tape, generally known as a cassette. The physical configurations of an assembled cassette are well-known and are defined by specific standards adapted by various engineering and trade associations. See, for example, "A Tape Cassette Standard" by Edward R. Hanson in the *Journal of the Audio Engineering Society*, Vol. 16, No. 4, Oct., 1968, pp. 430 ff.

As the market demand for cassettes increases, it is desirable to have a simple, fast, and low-cost yet reliable, method of manufacture. Preferably the method should use automated production line techniques.

A significant problem in perfecting an automated manufacturing technique is the introduction of the magnetic tape into the cassette. In the final product, the tape, wound around a first rotatable hub, is threaded past guide means to a second rotatable hub. Because of the intricate path taken by the tape and the necessity to gently handle the thin, fragile, tape, the tape insertion has been handled heretofore by human operators.

In a copending application, assigned to the present assignee, a method of manufacture is provided whereby the bottom portion of the cassette body is fitted over a pair of rotatable spindles on a moving assembly line. The spindles extend upright through two holes in the cassette bottom and a hub having a pin slot in its periphery is placed on the end of each spindle. Leader tape from a supply source is pinned to the leading hub of a cassette and the spindle is rotated to wind up a foot or two of leader. The leader is then pinned to the trailing hub of that cassette and the leading hub of the next cassette on line and that portion of leader tape between the hubs of subsequent cassettes is cut off and discarded. A pair of arms then engages the leader of the cassette pulling it from the leading hub and positioning it over the channel through which the tape passes in the assembled cassette. The cassette is raised, dropping the hubs to seat them in the cassette bottom, and the leader arms are removed leading the leader into the desired tape path. Upon joining and attaching the top and bottom of the cassette structure, the leader is pulled through a passage in the front of the cassette, is cut, and the desired amount of tape is spliced between the two ends of leader tape fixed to the hubs. The tape is then wound up by rotating one of the hubs thus completing manufacture of the cassette.

In order to practice the method described above, a modification in the design of the cassette bottom and top portions is required to remove certain portions of the cassette bottom that would interfere with the tape as it is moved outward and is set into place by the aforementioned arms.

SUMMARY OF THE INVENTION

In order to provide top and bottom cassette portions that mate properly so as to provide a standard assembled cassette, while eliminating the obstructions in the bottom portion to permit the practice of the method of the aforementioned copending application the typical prior art cassette halves have been modified. In providing a new design although the obstructions in the bottom half are removed, structure for guiding the tape along its desired path in the assembled cassette is retained.

The bottom and top portions of the cassette are identical to the standardized prior art cassette halves as to the general rectangular planar layout and include, for example, flanged holes for the hubs and a rectangular window. The present structures differ chiefly in the portions vertical to the plane of the halves.

The bottom portion includes tape guide posts and most structure normally lying between the tape path and the rear of the cassette, however, the front edge of the cassette up to the tape path is unobstructed.

In the top portion, the cassette front wall and other structure are provided. Ordinarily, in the prior art cassettes, one-half of the vertical structure is formed on each half, whereas in the present design certain structure is omitted from one-half and is instead provided in the other half as a length sufficient for the full thickness of the cassette.

DESCRIPTION OF THE PREFERRED EMBODIMENTS

Figure 1:
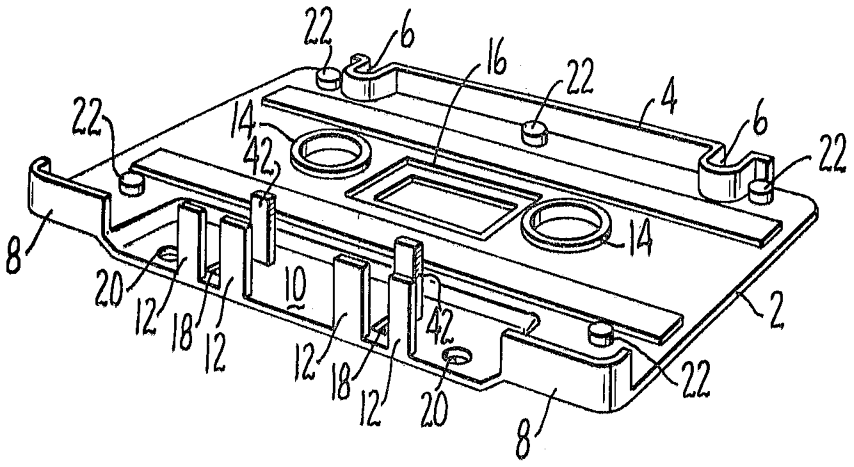
FIG. 1 is a perspective view of the top portion of a cassette according to this invention.
Figure 2:
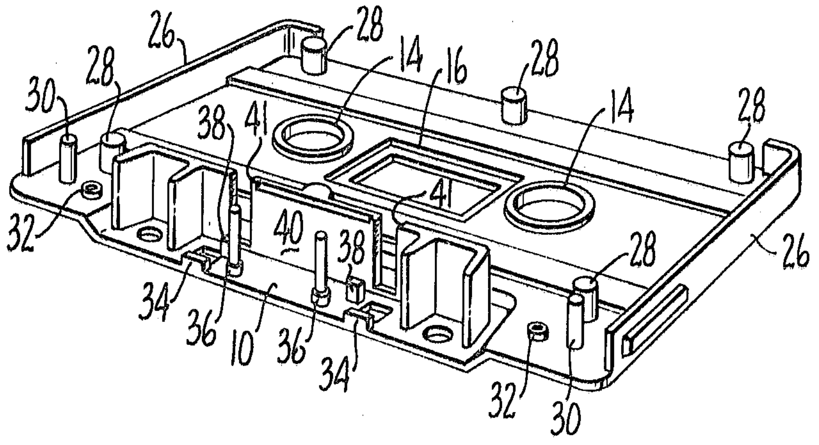
FIG. 2 is a perspective view of the bottom portion of a cassette according to the present invention.

Referring now to FIGS. 1 and 2, the top or cover and bottom portions or subassemblies, respectively, of a cassette to be assembled are shown as unitary pieces of molded plastic. Although the assembled cassette is essentially identical to prior art cassettes, the top and bottom portions differ from those of prior design. This design facilitates the practice of the method of manufacture of the above-mentioned copending application.

The top assembly 2 in FIG. 1 is a generally rectangular plane sheet having rounded edges and having longitudinal dimensions exceeding the transverse dimensions. A perpendicular wall 4 having a pair of inwardly dimpled portions 6 extends along the top rear edge of the assembly from a point near the left rear edge to a point near the right rear edge. Two perpendicular wall portions 8 extend along the left and right front edge of the assembly. A slightly depressed trapezoidal portion 10 is located centrally along the front portion of the assembly between walls 8. Four perpendicular fingers 12 are disposed symmetrically in pairs along the front edge of the portion 10. The fingers 12 and wall portions 8 have heights substantially equal to the thickness of the assembled cassette. A pair of flanged circular holes 14 are located in the left and right central portions of the assembly for engaging hubs that will be inserted and a rectangular hole or window 16 for viewing the tape on each hub in a finished cassette is located between holes 14. A pair of square holes 18 for insertion of holding fingers during cassette use in a player (not shown) are located symmetrically in the depressed portion 10 a small distance from the edge of assembly 2 and between fingers 12 and walls 8. Five short perpendicular cylindrical posts 22 are disposed in the top of the assembly 2; one is located near each corner of the assembly and the fifth is centered near the rear of the assembly.

Bottom assembly 24 is designed to mate with the top portion 2 and is a rectangular, substantially planar sheet of substantially the same dimensions. A pair of perpendicular sidewalls 26 extend from the rear of the assembly to near the front edge. When fit together with top assembly 2, walls 4, 8 and 26 form a unitary side structure that encloses the cassette except for the open portion between walls 8 at the front of the cassette. Five cylindrical posts 28 are located to abut posts 22 when the assemblies are joined in order to provide structural rigidity to the cassette. A pair of flanged holes 14 and a rectangular hole or window 18 are located in the same positions as in the top assembly. A pair of perpendicular pins or guides 30 are located near the front left and right edges of the assembly 24 in order to provide tape guidance. A pair of receptacles 32 are provided adjacent and centrally of pins 30 for insertion of metal pins and rollers during the assembly. If desired the rollers may be omitted; thus; receptacles 32 could be omitted. A slightly depressed trapezoidal portion 10 as in the top assembly is also provided. A pair of short fingers 34 are located to fit between each pair of fingers 12 in the top assembly. A pair of tape guide pins 36 are located centrally in the depressed portion 10. A pair of cubes 38 are located slightly behind and to the left and right of pins 36. A perpendicular double U-shaped wall 40 is located to the rear of depressed portion 10. Wall 40 has a long portion parallel to the front edge of assembly 24 and has two U-shaped sections opening to the front of the assembly at the left and right ends of the depressed portion. A pair of slots 41 may be provided in the wall 40 behind the tape path to facilitate movement of tape manipulating arms back into the cassette after guiding the tape into the tape path; in this situation, a pair of tabs 42 are provided on the top portion to close the slots when the cassette is assembled. It will be noted that both the top and bottom portions of the cassette are symmetrical about a line running from front to rear through the center of the plane of each section. It will be further apparent that the bottom structure 26 has no structural elements along its front edge to interfere with the placement of tape into the tape path.

Although the present invention has been described with respect to a particular tape cassette design, it will be apparent to those of ordinary skill in the art that minor variations in cassette design, such as the inclusion or omission of windows or rollers, or magnetic shielding or the like does not affect the scope of the present invention and that the invention is to be interpreted only as defined in the appended claims.

I claim:

1. In a recording tape cassette having top and bottom portions defining an enclosure with a wall having apertures along the front edge thereof, a pair of rotatable hubs supported within the enclosure and a tape guide path extending between said hubs adjacent said apertures, the improvement comprising:

a substantially planar cartridge bottom portion having a pair of hub supports and means for guiding the tape therebetween along said guide path, the area of said cartridge bottom portion between said guide path and the front edge of said bottom portion being unobstructed, and a substantially planar cartridge top portion, adapted for engagement with said bottom portion and having a pair of hub supports and said apertured wall along the front edge thereof.

2. A recording tape cassette having top and bottom portions defining an enclosure with a wall having apertures along the front edge thereof, a pair of rotatable hubs supported within the enclosure and a tape guide path extending between said hubs adjacent said apertures, said bottom portion comprising:

a substantially rectangular planar sheet having longitudinal dimensions exceeding the transverse dimensions, said front edge being along one of said longitudinal dimensions, a pair of centrally located hub supports, sidewalls perpendicular to said planar sheet extending substantially along the transverse dimensions thereof, means for guiding tape along said guide path, the area of said bottom portion between said guide path and said front edge being unobstructed, and said top portion comprising a substantially rectangular planar sheet having longitudinal dimensions exceeding the transverse dimensions said dimensions substantially equal to the dimensions of said bottom portion, said front edge being along one of said longitudinal dimensions, a pair of centrally located hub supports, a wall perpendicular to said planar sheet extending substantially along the other longitudinal dimension of said sheet, and a plurality of perpendicular members along the front edge of said sheet defining said apertures, said members substantially equal to the thickness of the cartridge.

3. The recording tape cartridge of claim 2 wherein said tape guide means comprises a plurality of members perpendicular to the plane of said bottom portion and located adjacent said tape guide path.

* * * * *